Jan. 31, 1939.   J. D. SHERMAN ET AL   2,145,839
COMPOSITE STRUCTURAL MEMBER
Original Filed Feb. 24, 1936
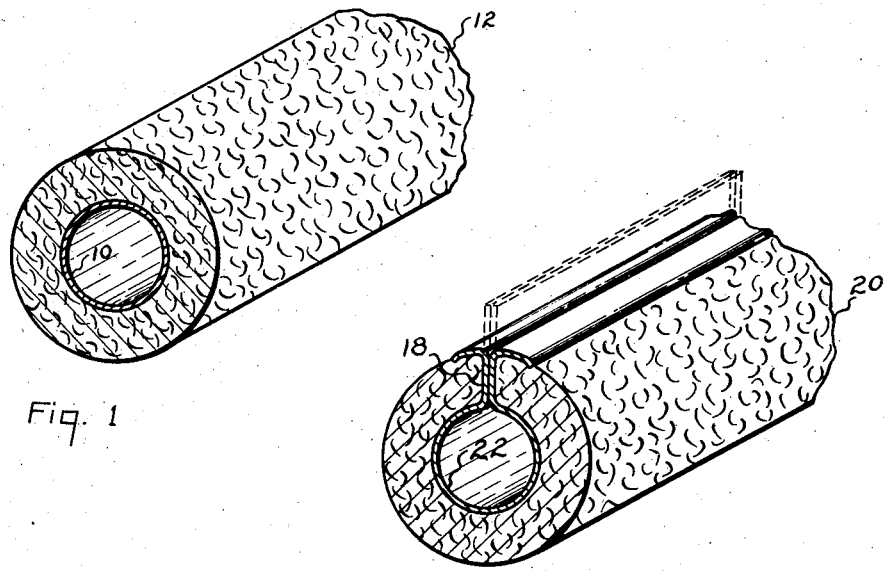
Fig. 1
Fig. 2
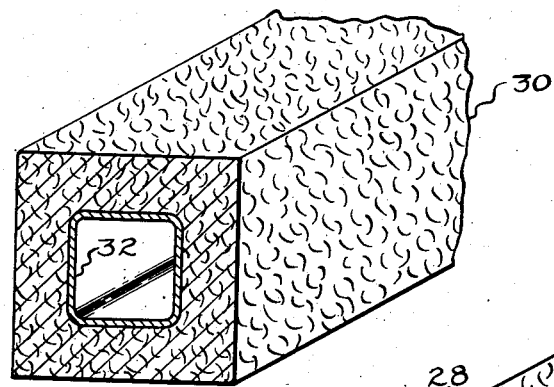
Fig. 3
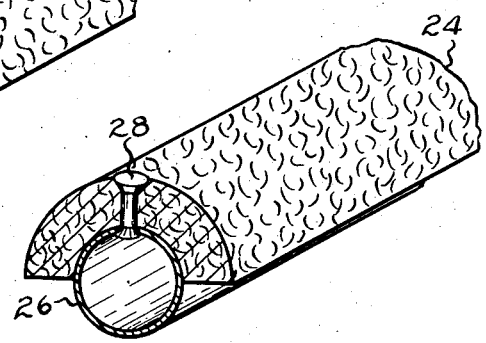
Fig. 4
Inventor
Jacob D. Sherman
Clair S. Reed
Otis C. Currie
By Beaman & Langford
Attorneys Patented Jan. 31, 1939

2,145,839

UNITED STATES PATENT OFFICE 2,145,839

COMPOSITE STRUCTURAL MEMBER

Jacob D. Sherman, Clair S. Reed, and Otis C. Currie, Jackson, Mich., assignors to Reynolds Spring Company, Jackson, Mich., a corporation of Delaware Original application February 24, 1936, Serial No. 65,404. Divided and this application January 2, 1937, Serial No. 118,826

4 Claims. (Cl. 20—74)

The present invention relates to improvements in composite structural members preferably of sheet metal and fibrous strip and constitutes a division of our co-pending application Serial No. 65,404, filed February 24th, 1936.

An object of this invention is to provide strong, light one-piece structural members for general use as framework elements and the like in which a surface or surfaces are desired to receive fastening instrumentalities such as tacks, nails, screws, and the like.

Another object is to provide composite metal and fibre structural members of a design in which the exposed nailing and tacking areas have been materially increased over prior structures.

A further object is to provide an improved composite metal and fibrous structural member of a design in which the sheet metal constitute in general a reinforcing interior structure for the fibrous exterior.

The uses of the present invention are unrestricted in scope and generally may be described as those to which wooden structural members have heretofore found application. One particular field of application is that of upholstered structures in which a tacking surface is required. This would include vehicle seats and bodies, furniture, box springs, etc. Other uses of the invention are found in the field of metallic building structure in which nailing surfaces for applying the exterior and interior structure, and the like, is desirable. The invention also has application to the fabrication of frameworks of all descriptions in which strength and lightness of construction is desired and a tacking or nailing surface may or may not be required.

Heretofore, as appears from the patented art, composite structural members have been proposed of metal and wood or fiber of widely varied cross-section in the furniture, vehicle, and building fields. Where wood has been used for the most part the same has been glued or bolted to the metal structure or encased in the metal to protect or increase the rigidity of the already relatively rigid wooded structure. Composite structures of sheet metal and fiber, such as twisted and laminated paper, are also known but their uses have been primarily limited to cushion spring frame structure and have not been of a design permitting more than a limited field of application.

The present invention contemplates a composite metal and fibrous structural member which is fabricated in continuous or cut lengths and is made from a strip or bar of metal and fibrous strip or tubular section of twisted paper or the like. Preferably the fibrous strip or tubular section is preformed and sufficiently flexible to be handled from a coil or spool during fabrication if the cross-section of the strip or section permits and if not it is associated with the metal in cut lengths. After the composite structural member has been fabricated into its final form the fibrous strip or section, which normally contains about 12% moisture, will dry out and become relatively hard and rigid. The important feature of the invention resides in the design of the composite members in that a decided structural departure has been made from the metal encased wooden and fibrous tacking or nailing strip and in lieu thereof the metal became in general a reinforcing interior structure thus greatly increasing the exposed surface of the fiber over prior practices. As a result the utility and field of application of the composite structure member has been materially enhanced.

The foregoing and other objects will be apparent from the following specification when taken with the accompanying drawing in which Figs. 1, 2, 3 and 4 are broken oblique projections of several embodiments of the invention, the composite metal and fibrous members being shown in section.

Referring to Fig. 1 of the drawing, the reference character 12 indicates a tubular fibrous strip having snugly telescoped therein a tubular reinforcing member 10. The strip 12 is preferably formed of paper or other fibrous stock and may be twisted, compressed, laminated or otherwise suitably constructed. The tubular reinforcing member 10 may be welded, drawn or otherwise formed, but preferably is of relatively thin yet strong sheet metal. The fibrous strip 12 and the tube 10 both may be preformed and the tube 10 inserted or fibrous material may be continuously molded about the tube 10. In either case a more secure connection between the fibrous strip 12 and the tube 10 may be obtained by expanding the tube 10 within the strip 12. The method of the construction of the structural elements disclosed in Figs. 2, 3 and 4 may be similar to that disclosed with respect to the construction of the structural element shown in Fig. 1. However, the method of construction of the structural elements disclosed in any of the figures is not of importance here as only the article is being claimed as the invention.

Of similar construction to the form of Fig. 1 is the element disclosed in Fig. 3 having a tubular fibrous strip 30 and an interior metallic tubular reinforcing member 32 both of rectangular cross-section. It will be obvious of course that other tubular forms may be used within the scope of the present invention.

In Fig. 2 is disclosed another form of the invention. Therein the tubular fibrous strip 20 has a longitudinal split extending radially from the interior to the exterior surface. Telescopically received within the strip 20 is a metallic tubular reinforcing member 22 which likewise is split longitudinally and has its longitudinal edges projecting radially outwardly in the form of contiguous flanges disposed in the longitudinal split of the fibrous strip 20. The outer edges of the flanges 18 are spread apart in opposite directions and rolled into contacting relation with the exterior surface of the strip 20 adjacent the edges of its split.

Another form which the invention may take is disclosed in Fig. 4 in which the fibrous strip 24 is semi-cylindrical. The strip 24 is preformed and is secured by rivets 28 to a preformed tubular reinforcing member 26, one-half of the exterior surface of the member 26 snugly engaging the interior surface of the strip 24. The strip 24 may have some other configuration than semi-cylindrical. For instance it might constitute one-half of the strip 30 disclosed in Fig. 3. In such a case the tubular member 26 would assume the configuration of the member 32. Likewise, other configurations may be used wherein the reinforcing member is tubular and the fibrous strip longitudinally engages a portion of the surface of the reinforcing member.

It will be obvious from the foregoing specification that the composite structural members of metal and fibrous material, as disclosed, constitute forms of the invention as disclosed in our aforesaid parent application wherein a maximum exposed surface of fiber is available for tacking.

Having thus described our invention what we claim as new and desire to protect by Letters Patent is:

1. A composite structural member of the character described comprising a semi-cylindrical fibrous strip having an interior surface and a metallic reinforcing member having an exterior surface, said member being tubular in configuration, its exterior surface engaging the interior surface of said strip.

2. A composite structural member of the character described comprising a tubular fibrous strip having an interior and an exterior surface, said strip having a longitudinal split between said interior and said exterior surfaces, and a longitudinally split tubular metallic reinforcing member having its longitudinal edges projecting outwardly, said member being within said strip, snugly engaging the interior surface thereof, and said radially projecting edges projecting outwardly through said split.

3. A composite structural member of the character described comprising a tubular fibrous strip having an interior and an exterior surface, said strip having a longitudinal split between said interior and said exterior surfaces, and a longitudinally split tubular metallic reinforcing member having its longitudinal edges projecting outwardly in the form of contiguous flanges, said member being within said strip, snugly engaging the interior surface thereof, and said contiguous flanges projecting outwardly through said split, the outer edges of said flanges being spread apart and in engagement with the outer surface of said strip, adjacent said split.

4. A composite structural member of the class described comprising a preformed, fibrous, grainless, tough, tack receiving and gripping strip constituting an exposed exterior tacking surface and a metal strip conforming to the interior surface of said preformed fibrous strip and constituting a reinforcing interior structure therefor, said metal strip embracing the longitudinal edges of said fibrous strip.

JACOB D. SHERMAN.
CLAIR S. REED.
OTIS C. CURRIE.